G. C. Germain's Pipe Coupling.

110028  PATENTED DEC 18 1870

United States Patent Office.

GEORGE C. GERMAIN, OF CUYAHOGA FALLS, OHIO.

Letters Patent No. 110,028, dated December 13, 1870.

IMPROVEMENT IN PIPE-COUPLINGS.

The Schedule referred to in these Letters Patent and making part of the same.

To all whom it may concern:

Be it known that I, GEORGE C. GERMAIN, of Cuyahoga Falls, in the county of Summit and State of Ohio, have invented a new and improved Mode of Jointing Sections of Pipe; and I do hereby declare that the following is a full, clear, and exact description of the same, reference being had to the accompanying drawing forming a part of this specification.

The purpose of my invention is to form a cheap and tight coupling-joint for pipes generally, but especially for ditching-pipes. These pipes are of iron, clay, or other suitable material, and are made in short sections, which are usually coupled together by a sheet-metal sleeve, rendered tight by water-lime. I accomplish this object by means of a wrapping of canvas saturated in asphaltum or analagous substance.

In accordance with the requirement of the patent law I will describe the method which I preferably employ in the application of my sleeve:

I soak a sheet of canvas of suitable width in some liquid water-repellant and adhesive solution, and wind it therefrom on a mandrel. From this mandrel it is wound about the two sections of a pipe at their point of junction.

The pipes are placed in contact with the mandrel for the purpose of condensing the adhesive and water-repellant substance into the fabric.

Figure 1:
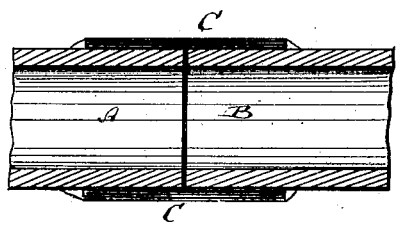

Figure 1 is a longitudinal, and

Figure 2:
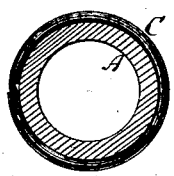

Figure 2, a cross-section of two pipes joined together.

A and B are two sections of a ditching-pipe made of iron or clay, and

C, the saturated canvas.

The sections of pipe, a kettle of adhesive repellant, and the rolls of canvas are taken in wagons to the place where they are to be used. The pipes are then coupled on the spot and immediately applied to the ditch or drain.

Having thus described all that is necessary to a full understanding of my invention,

What I claim as new, and desire to protect by Letters Patent, is—

The application of a canvas wrapping C, saturated in some adhesive water-repellant, to the sections A B of an iron or clay pipe, for the purpose of forming a tight joint, as described.

GEORGE C. GERMAIN.

Witnesses:
J. H. COOKE,
H. B. CAMP.